United States Patent Office 3,372,057
Patented Mar. 5, 1968

3,372,057
COATED ELECTRODE FOR ARC WELDING OF CAST IRON
Horst Seifahrt, Lausanne, Switzerland, assignor to Societe des Soudures Castolin S.A., St. Sulpice, near Lausanne, Switzerland
No Drawing. Filed Sept. 4, 1964, Ser. No. 394,607
Claims priority, application Switzerland, Sept. 6, 1963, 11,087/63
5 Claims. (Cl. 117—206)

ABSTRACT OF THE DISCLOSURE

An electrode suitable for arc welding cast iron, gray cast iron, globular cast iron, and the like is provided by using ferro-nickel as a core element coated with a composition containing an alkali earth metal, fluorine, aluminum, silicon oxide, iron, carbon dioxide in form of a carbonate and carbon. A binder for the above components and a plasticizer for the coating is also provided. An iron to nickel relationship of approximately 40 to 60 to a 60 to 40 is suitable for the core element. A coating factor showing a relationship between the diameter of the coated electrode and the core is advantageously from 1.35 to 1.50.

This invention relates to electrodes for electric arc welding of cast iron, more particularly to a coated electrode for cold welding of gray iron, globular iron, etc.

Electrodes with which it is possible to cold weld cast iron are already known. However, welds and overlays obtained with these known electrodes are often not free of cracks; they are also frequently too hard to be worked by cutting tools.

An object of this invention is to provide an electrode for cold welding of cast iron by the use of which welds and overlays can be obtained which stand up to the most considerable stress.

Another object of this invention is to provide a coated electrode for cold welding of cast iron, more particularly of gray and globular cast iron, giving welds and overlays which are substantially free of cracks and yet machinable with cutting tools.

These and other objects will in part be understood from and in part pointed out in the following description.

In accordance with the present invention there is provided a coated electrode comprising a ferro-nickel core, notably and especially with a Fe/Ni relationship of 40/60 to 60/40 and a coating containing:

| | Percent by weight |
|---|---|
| Alkaline-earth metals | 20 to 40 |
| Fluorine | 1 to 10 |
| Aluminum | 3 to 15 |
| $SiO_2$ | 1 to 10 |
| Iron | 15 to 40 |
| $CO_2$ | 5 to 20 |
| Carbon | 5 to 20 |

The coating contains also the usual binders such as alkaline silicates and small amounts of organic plasticizers such as alginates, dextrins, etc.

In this coating composition, there are found for example and preferably, iron in the form of oxide, carbon in the form of graphite, alkaline-earth metals such as strontium in the form of carbonates, silicon in the form of ferro-silicon, and fluorine in the form of calcium fluoride.

The coating factor F i.e. the relationship of $$\frac{\text{diameter of coated electrode}}{\text{diameter of core}}$$

can be advantageously from 1.35 to 1.50.

A particularly useful coating contains, for example, together with binders and plasticizers as mentioned above:

| | Percent by weight |
|---|---|
| Alkaline-earth metals (notably Ca and Sr) | 28 to 32 |
| Fluorine | 4 to 6 |
| Aluminum | 7 to 12 |
| $SiO_2$ | 4 to 6 |
| Iron | 22 to 28 |
| $CO_2$ | 10 to 14 |
| Carbon | 10 to 14 |

Results obtained with the electrode according to the invention are distinctly better than those obtained with known electrodes of the same type without, till now, being able to explain why. It welds with finer drops, can be easily applied to all grooves even the finest, gives rise to no undercuts and produces impeccable welds, practically free of cracks and porosity hard and strong, while being workable with cutting tools. Slag can be easily removed and weld beads are uniform and of good appearance.

I claim:
1. A coated electrode for cold welding of cast iron, gray cast iron, globular cast iron and the like, comprising a ferro-nickel core having a Fe/Ni relationship of about 40/60 to 60/40 and a coating containing:

| | Percent by weight |
|---|---|
| Alkaline-earth metals | 20 to 40 |
| Fluorine | 1 to 10 |
| Aluminium | 3 to 15 |
| $SiO_2$ | 1 to 10 |
| Iron | 15 to 40 |
| $CO_2$ | 5 to 20 |
| Carbon | 5 to 20 |

2. A coated electrode as per claim 1, wherein the coating contains as a binder an alkaline silicate, and as a plasticizer an alignate or a dextrin.

3. A coated electrode as per claim 1, wherein the coating contains:

| | Percent by weight |
|---|---|
| Alkaline-earth metals e.g. Ca and Sr | 28 to 32 |
| Fluorine e.g. in the form of $CaF_2$ | 4 to 6 |
| Aluminum | 7 to 12 |
| $SiO_2$ e.g. in the form of FeSi | 4 to 6 |
| Iron e.g. in the form of oxide | 22 to 28 |
| $CO_2$ e.g. in the form of carbonates | 10 to 14 |
| Carbon e.g. in the form of graphite | 10 to 14 |

4. A coated electrode according to claim 3 wherein the coating comprises: as a alkaline earth metal calcium or strontium in the form of a carbonate; fluorine in the form of $CaF_2$; silicone dioxide in the form of FeSi; iron in the form of an oxide; carbon dioxide in the form of a carbonate; and carbon in the form of graphite.

5. Coated electrode as per claim 1, wherein the coating factor is from 1.35 to 1.50.

References Cited

UNITED STATES PATENTS 2,855,333 10/1958 Wasserman et al. 117—207
3,253,950 5/1966 Wasserman et al. 117—206

WILLIAM L. JARVIS, *Primary Examiner.*

UNITED STATES PATENT OFFICE
CERTIFICATE OF CORRECTION

Patent No. 3,372,057                                      March 5, 1968

Horst Seifahrt

It is hereby certified that error appears in the above numbered patent requiring correction and that the said Letters Patent should read as corrected below.

Column 2, line 47, strike out "e.g. Ca and Sr"; line 48, strike out "e.g. in the form of $CaF_2$"; line 50, strike out "e.g. in the form of FeSi"; line 51, strike out "e.g. in the form of oxide"; line 52, strike out "e.g. in the form of carbonates"; line 53, strike out "e.g. in the form of graphite".

Signed and sealed this 20th day of May 1969.

(SEAL)
Attest:

Edward M. Fletcher, Jr.
Attesting Officer

Commissioner of Patents